Sept. 22, 1970           C. L. HUNT           3,529,738
VEHICLE HAVING IMPROVED UNLOADER MECHANISM
Filed July 29, 1968
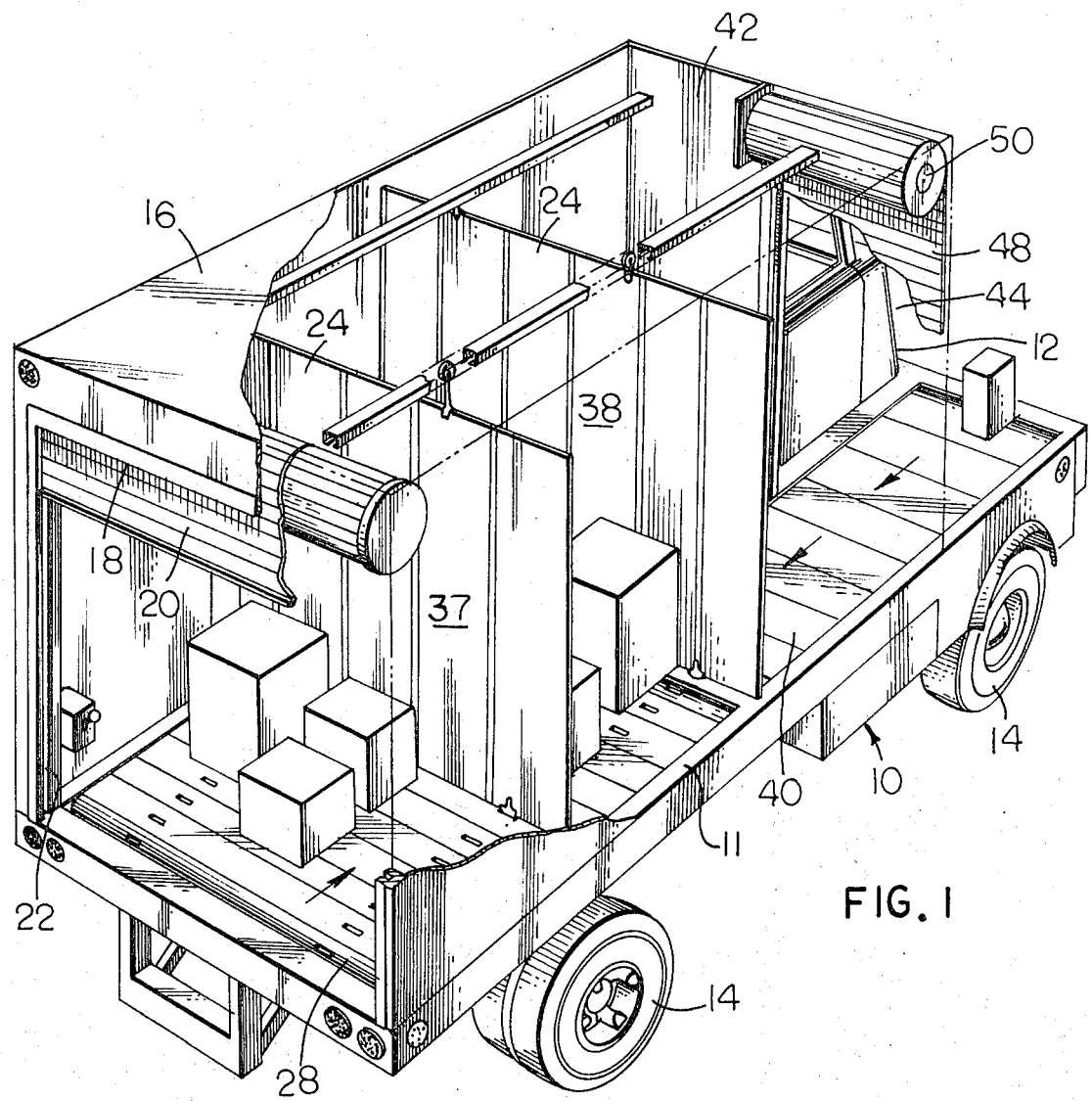
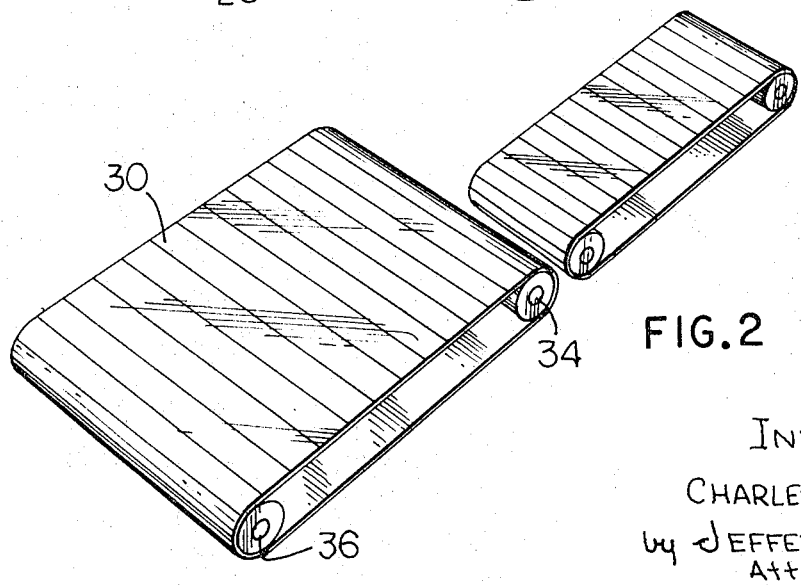
INVENTOR
CHARLES L. HUNT
by JEFFERS & YOUNG
Attorneys United States Patent Office 3,529,738
Patented Sept. 22, 1970

3,529,738
VEHICLE HAVING IMPROVED UNLOADER MECHANISM
Charles L. Hunt, 1721 Shamrock Road,
Fort Wayne, Ind. 46807
Filed July 29, 1968, Ser. No. 748,556
Int. Cl. B60p 1/38
U.S. Cl. 214—519                               5 Claims

ABSTRACT OF THE DISCLOSURE

This invention relates to a vehicle having a bed with an unloader mechanism which vertically supports the cargo and permits unloading of the cargo by power actuated means which vertically supports the cargo and is adapted to move the cargo from any portion of the van to the discharge end thereof.

BACKGROUND OF THE INVENTION

In the process of delivering packages by vehicles there has been a long standing problem of how to handle cargo, particularly if there is only a single operator. The difficulty of picking and carrying cargo from one end of a van to another has proved to be particularly difficult and time-consuming and can be injurious to the driver.

What is needed, is an accessible and inexpensive internal transporter means within a truck which will quickly and easily move the freight about the truck so that it can be discharged easily and with minimum effort on the part of the driver. Although many proposals have been made for use in combination with vehicles, especially delivery trucks and the like, such arrangements have not proved successful either because they added considerable expense to the vehicle or else once having been provided they were not practical to operate or maintain. The state of the art is such that in most instances trucks have not been equipped with an internal transporter means. As a consequence, more personnel are needed for handling freight, and it takes a greater period of time to discharge the freight at the assigned point. There is also, always the possibility of injuring personnel because of over-stressing conditions in handling freight within the limited and awkward confines of the truck.

With these problems in mind, the following objectives of the invention are proposed.

OBJECTS OF THE INVENTION

It is one of the objects of the present invention to provide a vehicle having a movable platform which can facilitate the movement of freight within the vehicle in a manner which enables the user to conveniently and rapidly unload and load freight.

Another object of the present invention is to provide a system for moving freight interiorly of the vehicle, which will make it possible for a single operator to handle the loading and unloading of freight.

It is an overall object of the present invention to use an improved freight-handling means which enables the transporting vehicle driver to easily shift cargo at the time of delivery and to make unassisted drop-offs which would not otherwise be possible.

Other objects and features of the present invention will become apparent from a consideration of the following description, which proceeds with reference to the accompanying drawings, wherein:

FIG. 1 is an isometric view of a cargo carrier having walls and partitions broken away to illustrate the interior support deck for the cargo, and FIG. 2 is an isometric detail view of a movable platform within the vehicle.

Referring now to the drawings, a vehicle 10 having a bed 11 and cab 12 and ground engaging wheels 14 is adapted for highway travel in making deliveries of cargo.

A closed van 16 having a rear opening 18 is equipped with an overhead door 20 which can be raised or lowered in a track 22 to allow for discharge and loading of cargo. Within the van are a series of partitions 24 which can be spaced to divide the interior of the van into compartments for receiving cargo according to its respective destination, and also to prevent shifting of the cargo under inertia when the vehicle accelerates or decelerates in a forward or reverse direction. The partitions can be anchored on the platform 28, the platform being made up of a series of movable belts 30 having change direction rollers 34, 36 at the opposite ends thereof so that the belt can move endlessly around the rollers 34, 36. There are two series of belts, in compartments 37 and 38 respectively, and a smaller belt 40 alongside cab 12 and adapted to move freight around the rollers 34, 36. There are two series of belts, one in each of compartments 37 and 38 respectively, and a smaller belt 40 alongside cab 12 and adapted to move freight within compartment 42 toward the front and rear ends respectively of the vehicle. There is a discharge opening 44 at the forward end of the vehicle which is normally closed by a vertically movable closure member 48 on drum 50.

The belts can be moved in either of opposite directions, in order to move freight back and forth, and to transfer it from one compartment to the next, and eventually, either discharge or load the freight thru the forward opening 44 or rear opening 20.

The freight can also be caused to slide laterally on the belt 30 since the belts are constructed of a suitable frictionless material enabling the freight to slide and also to move with belt movement so that by a combination of belt movement and lateral movement, the driver can shift the cargo easily from one compartment to the next and to discharge or load it through one or the other of the forward and rear openings.

One of the distinct advantages of the present invention is that a driver, unassisted with any other personnel, can easily and quickly discharge a piece of freight within one of the compartments or effect loading and location of such freight at a preferred location within the truck and in this way take the freight to its destination, at a faster rate. This is a distinct advantage inasmuch as the person involved is generally under certain pressure of time to complete his allotted round of deliveries, and the time spent in locating and discharging freight adds unnecessarily to the delivery time. Often these items of freight have been transported over considerable distances by air and it is of importance to make the delivery in its final phases by an overland delivery truck, as for example, in the quickest manner possible, with minimal or no damage to the freight.

OPERATION

In operation, the driver has available power actuation for causing rollers 34, 36 to turn in unison and any one of the platforms can be individually operated or operated in unison, depending upon the movement of freight which is desired at a given time and destination.

In another feature of the present invention, the compartments 37, 38 can be removed entirely where all of the freight is ear-marked for the same location. The benefits of the invention still realized, since the discharge rate of the packages during unloading can proceed much more quickly with co-ordinated operation of the respective belts.

In a still further embodiment of the invention, the belts can be operated simultaneously in opposite directions in order that freight can be discharged both at the front opening and rear opening if additional personnel is available at the point of unloading or loading. This way it is possible to empty the entire vehicle of its contents in minimum time and to load it in minimal time. Therefore, the driver can maximize the time that he is spending on the road, and thus reduce the time it takes to make a delivery.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention to suit design requirements, and it is intended that such revisions and adaptations will be included within the scope of the following claims, as equivalents of the invention.

What I claim is:

1. In a vehicle having a bed, means forming an enclosure around said vehicle bed to form a protective interior, wall means forming a plurality of compartments for subdividing the bed into distinct storage compartments, said bed including an individual conveyor unit for each compartment, said wall means being removable whereby freight can be conveyed unencumbered from one compartment to another, front and rear doors, means for opening and closing said front and rear doors whereby freight can be loaded at the front or rear of the vehicle bed and successively conveyed forward or rearward through the compartments for unloading at the front or rear of the vehicle without lifting such freight.

2. The vehicle structure in accordance with claim 1 including a conveyor unit at the forward end of the vehicle disposed laterally adjacent the vehicle cab and adapted to effect horizontal cargo movement relatively thereto.

3. Vehicle transportation apparatus in accordance with claim 1 wherein each said conveyor unit consists of continuously movable, flexible means adapted to move endlessly, a pair of spaced change-direction members adapted to move said endlessly movable members back and forth between said change-direction members.

4. The transportation structure in accordance with claim 1 wherein said conveyor units are proportioned to substantially fill the bed area of said vehicle.

5. The structure in accordance with claim 1 including motor means for energizing each said conveyor unit, and control means accessible to the operator to effect movement of the freight supported on said conveyor units.

References Cited

UNITED STATES PATENTS

| | | | |
|---|---|---|---|
| 3,228,542 | 1/1966 | Achammer | 214—38 |
| 3,352,595 | 11/1967 | Bezlaj | 296—24 |

ALBERT J. MAKAY, Primary Examiner

U.S. Cl. X.R.

214—83.36; 296—24